(12) United States Patent
Trayford et al.

(10) Patent No.: US 6,882,930 B2
(45) Date of Patent: Apr. 19, 2005

(54) METHOD AND SYSTEM FOR PROVIDING TRAFFIC AND RELATED INFORMATION

(75) Inventors: Ros Trayford, Montmorency (AU); Charles Karl, Lower Templestow (AU); Julian Van Leersum, Fig Tree Pocket (AU)

(73) Assignee: Stratech Systems Limited, Singapore (SG)

( * ) Notice: Subject to any disclaimer, the term of this patent is extended or adjusted under 35 U.S.C. 154(b) by 73 days.

(21) Appl. No.: 10/312,702

(22) PCT Filed: Jun. 26, 2001

(86) PCT No.: PCT/AU01/00758

§ 371 (c)(1),
(2), (4) Date: Dec. 26, 2002

(87) PCT Pub. No.: WO02/01532

PCT Pub. Date: Jan. 3, 2002

(65) Prior Publication Data

US 2004/0038671 A1 Feb. 26, 2004

(30) Foreign Application Priority Data

Jun. 26, 2000 (AU) .......................................... PQ 8381
May 4, 2001 (AU) .......................................... PR 4793

(51) Int. Cl.$^7$ ............................................... G06F 7/70
(52) U.S. Cl. ........................ 701/117; 701/118; 701/225; 340/907

(58) Field of Search ......................... 701/117–118, 225; 340/907, 909

(56) References Cited

U.S. PATENT DOCUMENTS

| 5,610,821 | A | | 3/1997 | Gazis et al. ................ 701/117 |
| 6,317,686 | B1 | * | 11/2001 | Ran ............................ 701/210 |
| 6,587,781 | B1 | * | 7/2003 | Feldman et al. ............ 701/117 |
| 2003/0216857 | A1 | * | 11/2003 | Feldman et al. ............ 701/117 |

FOREIGN PATENT DOCUMENTS

WO   WO 93/09511   5/1993

* cited by examiner

*Primary Examiner*—Gertrude A. Jeanglaude
(74) *Attorney, Agent, or Firm*—Laurence A. Greenberg; Werner H. Stemer; Gregory L. Mayback

(57) ABSTRACT

The invention provides a system for providing traffic or related information including: a database storing historical traffic data being operable to receive substantially real time traffic data and associated data; means for integrating historical, real time and associated traffic data with respect to traveller profiles to produce customized forecasted traffic information with respect to those traveller profiles; and means for sending the customized forecasted traffic information to an intended recipient wherein the customized forecasted traffic information includes predicted travel delays for travel routes described in the traveller profiles.

58 Claims, 6 Drawing Sheets

METHOD AND SYSTEM FOR PROVIDING TRAFFIC AND RELATED INFORMATION

FIELD OF THE INVENTION

The present invention relates to traveller information services and in particular to a system for providing forecasted traffic information to individual travellers.

BACKGROUND OF THE INVENTION

The monitoring and reporting of traffic conditions is an important factor in the management of traffic flow. From a motorists point of view, it can be vital in saving commuting time and unnecessary delays. Substantial effort has been directed to providing facilities which allow a motorist or other user to access traffic and related information in a timely manner.

One type of known traffic reporting is by use of a "spotter", namely designated persons or members of the public who report traffic incidents to radio stations or a central controller, for subsequent dissemination to the public. Such a system however, cannot sustain the demand placed on it by today's user requirements.

More developed prior art systems include the use of sensors on roads, such as cameras that are linked to a central facility for the dissemination of traffic information. Sensors may be strategically located at exits/entrances to freeways and major roads. Other systems are cellular/mobile telephony based with sensors or designated spotters stationed on major roads and freeways. Such systems are integrated with a central control facility to provide cellular network subscribers with information regarding traffic flow, accidents, detours, road construction, etc. Subscribers may also have the opportunity to dial in and retrieve instantaneous information regarding a particular aspect of the traffic network such as a freeway.

The above-described systems, however, are limited in their capacity to provide useful customised information to subscribers. They are generally limited to providing the status of current traffic conditions supplemented by updated/incident reports that may give a clue to the duration of a problem. This does not satisfy the needs of the motorist who requires information relating to what the conditions will be at some time in the future when he will be travelling past locations that are currently congested. Additionally, these systems do not provide an indication as to whether alternate routes are available and/or the details of those alternate routes.

A significant drawback of prior art systems is the lack of customised and critically timed information provided to individual subscribers.

It would therefore be desirable to provide a system for reporting traffic information to individual motorists in a timely and customised manner.

It would further be desirable to provide individual subscribers of a network with forecasted traffic information relevant to those individual subscribers.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention before the priority date of each claim of this application.

SUMMARY OF THE INVENTION

The present invention provides a system for providing traffic or related information comprising:

a database storing historical traffic data and being operable to receive substantially real time traffic data and associated data;

means for deterministically integrating the historical and real time traffic and associated data with respect to at least one traveller profile to produce customised forecasted traffic information with respect to the at least one traveller profile; and means for sending the customised forecasted traffic information to an intended recipient wherein the customised forecasted traffic information comprises at least a predicted travel delay for at least one travel route described in the at least one traveller profile, wherein, where there is insufficient traffic data for a link of the travel route, the means for integrating is operable to use available data in respect of a further link in place of the insufficient traffic data on said link of said travel route in order to provide the predicted travel delay.

In a preferred embodiment, the customised forecasted traffic information is transmitted to an information distributor who distributes the traveller information to users who have subscribed to the information distributor for the purpose of receiving traffic information relevant to their travel requirements. In this instance, it is preferred that subscribers have remote terminals in order to receive the customised information. The system and the terminals may provide for communication from the subscriber to the system. and the terminals may provide for communication from the subscriber to the system.

Historical and real time traffic data is likely to mostly comprise data collected from traffic control signals and traffic sensors and detectors placed at strategic locations throughout a traffic network. The database may be operable to store historical and real time traffic data and/or associated data for frequent retrieval. The historical traffic data stored in the database preferably includes a sample of previous traffic data relating to geographical areas of interest to subscribers. Such data may include data from strategically relevant locations such as traffic congestion areas, traffic flow at particular landmarks and speeds along specific routes. Associated data may include data collected from other sensors and detectors such as sensors for measuring and reporting temperature and rainfall and may also include data relating to significant events that may have an impact upon the flow of traffic through a traffic network. (eg holidays?)

Associated traffic data stored in the database preferably includes information on incidents, accidents, road construction, alternate routes and weather information. Associated data maybe obtained from any print, electronic or radio communication which is then converted to data for storage in said database and subsequently used by the system.

The means for integrating historical, real time and associated traffic data may include a model that provides an indication of the expected delay for a particular link based upon historical records. Using a model as compared with referencing base data should reduce storage requirements and may also reduce computation time and hence provide more timely results.

By providing a system according to the present invention, a subscriber is able to receive traffic or related information with respect to his or her travelled route before and/or during the journey. The system may provide subscribers with updated and relevantly timed information which is forecasted with respect to a subscriber's customary travelling patterns.

The applicant has recognised that there is a "space-time window" in which a motorist requires personalised, customised and localised travel information and that information received before or after that "space-time window" period is of limited use to a traveller.

Of course, the system may include a database of information relating to subscribers and may supply customised forecasted traffic information directly to subscribers.

In an embodiment of the present invention there is provided a system for providing traffic and related information to subscriber terminals including:

a subscriber database;

a plurality of subscriber terminals in a network capable of receiving at least text messages;

a database storing historical traffic data being operable to receive substantially real time traffic data and associated data;

means for integrating said historical data and said real time data with respect to subscriber profiles stored in said subscriber database, to produce customised forecasted traffic information for individual subscribers; and means for sending said customised forecasted traffic information to individual subscriber terminals in said network at times that are critical to individual subscribers wherein the customised forecasted traffic information includes a predicted travel delay for travel routes described in a subscriber's travel profile.

In a preferred form of the invention, the subscriber is a motorist and the network is a cellular or a mobile communications network. The network may support Short Message Service (SMS), Wireless Application Protocol (WAP) or third generation (3G) wireless broadband networks.

The subscriber database preferably stores individual subscriber profiles in a non-volatile memory with each individual subscriber profile preferably including information regarding the identity of the subscriber. Profiles may also include parameters such as usual travel times, the route usually taken and the times at which a subscriber would prefer to receive customised forcasted traffic information. These times may be considered critical by the individual subscriber. A subscriber may be provided with access to a database to alter the parameters of their profile. The access maybe provided via a dedicated web-site.

Subscriber terminals may include a mobile communication device capable of receiving traffic information and/or other related information. The device may be a mobile telephone forming part of a mobile communications network and may be adapted to receive data in SMS, WAP or 3G formats. The device may even incorporate text to voice or IVR techniques.

Preferably, the device is able to request information from the database regarding historical or real time traffic information.

The means for integrating historical and real time data may include a model of the expected delays for various traffic links based upon historical data. In this instance, the model preferably includes an adaptive mathematical model for forecasting traffic information. The model may also compare the historical data variables with real time data in accordance with a subscribers travel route. Statistical techniques may be employed to determine the effects of the data variables and may include multi-variate regression, multi-variate time series, spectral analysis piece-wise daily templates or the like, or any combination thereof. In addition to expected delays resulting from traffic density, incidents may occur that could significantly increase the historically expected delays. The occurrence of an incident that may have a significant effect upon the forecasted delay to a subscriber may be sent to a subscriber prior to his or her next major route change thus enabling the subscriber to perhaps select an alternate route in an attempt to avoid any increase to the subscriber's expected travel time.

In a particularly preferred embodiment, the system includes a means for determining an optimal path of travel through a travel network. The means for determining the optimal path of travel through the network may employ a method that takes account of the direction of traffic flow on each individual travel link in the traffic network. Additionally, it is preferred that the method also take account of the different delays caused by traffic signals to individual traffic flows through a signal controlled intersection.

In some instances, there may only be limited historical traffic data available for any particular traffic network or part thereof. In addition, real time tic signal data may only be available for a limited number of signal controlled intersections of the traffic network at a frequency sufficient to be relevant for the purpose of predicting travel time. In this instance, the means for determining the optimal travel path through a traffic network preferably implements a method of matching data received from the limited number of signal controlled intersections with remaining intersections in the traffic network for which there is no timely available traffic signal data.

Similarly, in the instance where a system is intended to be used for a traffic network where there is limited available traffic data, or perhaps no traffic data is available, the system may include a means for determining an estimate of the travel flows wherein the means implements a method of matching signal controlled intersections from a traffic network with known data to the traffic network with limited traffic data. This enables the system to at least establish a first estimate that may be refined over time as more traffic data for that network becomes available.

In a preferred embodiment, the matching of data from traffic controlled intersections throughout a traffic network takes account of various factors including the geometry of the intersection, the orientation of the intersection and the ratio of actual flow of traffic resulting from a particular traffic signal as compared with the maximum flow of traffic possible for that same signal. This latter factor is referred to as the "degree of saturation" (DOS). Of course, the method of matching intersections throughout a traffic network may include additional factors such as historical daily averages for signal cycle times for the intersections. The various factors used to determine a match between intersections may be given a priority or weighting in order to establish an order of importance for each factor. This order, or weighting, of individual factors may vary when matching intersections with known data of a traffic network to those of another traffic network such as those in other cities. In addition, the order, or weighting, of individual factors may vary from one region of a traffic network to another.

The means for periodically sending customised traffic information may include at least one database server capable of sending at least text messages. The customised traffic information is preferably forwarded to a mobile network of the subscriber. The frequency and time of the information being formulated and dispatched may be determined by the subscriber's travel profile. The information may be sent before and/or during a subscriber's travel route.

In an alternative form, the forecasted information may be customised according to the location of the subscriber. The location or position of the subscriber may be determined by positioning systems such as Global Positioning System (GPS), Mobile Positioning System (MPS) or other means.

According to another aspect, the present invention provides a method of providing traffic or related information comprising the steps of:

a) storing historical, real time and associated traffic data in a database;

b) deterministically integrating said historical, real time and associated data with respect to a traveller profile to produce customised forecasted traffic information with respect to the traveller profile; and c) sending the customised forecasted traffic information to an intended recipient wherein the customised forecasted traffic information comprises a predicted travel delay for a travel route described in the traveller profile;

wherein, where there is insufficient traffic data for a link of the travel route, the step of integrating comprises using available data in respect of a further link in place of the insufficient traffic data on said link of said travel route in order to provide the predicted travel delay.

In an embodiment, the present invention provides a method of providing traffic or related information including the steps of:

a) storing historical, real time and associated traffic data in a database;

b) integrating said historical, real time and associated data with respect to traveller profiles to produce customised forecasted traffic information with respect to those traveller profiles; and c) sending the customised forecasted traffic information to subscriber terminals that are capable of receiving at least text messages in a network and at times that are critical to subscribers wherein the customised forecasted traffic information includes predicted travel delays for travel routes described in the subscriber's profile.

In a particularly preferred embodiment, the method includes the step of determining an optimal path of travel through a travel network which preferably takes account of the direction of traffic flow on each individual travel link in the network. Additionally, it is preferred that the method also take account of the different delays caused by traffic signals to individual traffic flows through a signal controlled intersection.

In some instances, there may only be limited historical traffic data available for any particular traffic network or part thereof. Additionally, real time traffic signal data may only be available for a limited number of signal controlled intersections of the traffic network at a frequency sufficient for that data to be relevant for the purpose of predicting travel time. In this instance, the means for determining the optimal path through the traffic network preferably implements a method of matching data received from the limited number of signal controlled intersections to remaining intersections in the traffic network for which there is no timely available traffic signal data.

Similarly, in the instance where a method is intended to be used for a traffic network where there is limited available traffic data, or perhaps no traffic data is available, the method may include the step of matching signal controlled intersections from a traffic network with known data to the traffic network with limited traffic data.

In a preferred embodiment, the method of matching data from traffic controlled intersections throughout a traffic network takes account of various factors including the geometry of the intersection, the orientation of the intersection and the ratio of actual flow of traffic resulting from a particular traffic signal as compared with the maximum flow of traffic possible for that same signal (i.e. the DOS). Of course, the method of matching intersections throughout a traffic network may include additional factors such as historical daily averages for signal cycle times for the intersections. The various factors used to determine a match between intersections may be given a priority or weighting in order to establish an order of importance of each factor. This order, or weighting, of individual factors may vary when matching intersections with known data to those of another traffic network such as those in other cities. In addition, the order, or weighting, of individual factors may vary from one region of a traffic network to another.

BRIEF DESCRIPTION OF THE DRAWINGS

The following description refers in more detail to the various features of the traffic information system of the present invention. To facilitate an understanding of the invention, reference is made in the description to the accompanying drawings where the traffic information system is illustrated in a preferred embodiment. It is to be understood that the traffic information system of the present invention is not limited to the preferred embodiment as illustrated in the drawings. In the drawings.

DETAILED DESCRIPTION OF A PREFERRED EMBODIMENT OF THE INVENTION

A preferred embodiment of the invention is described below with reference to the accompany FIGS. 1 to 6.

Real Time Traffic Related Data

Figure 1:
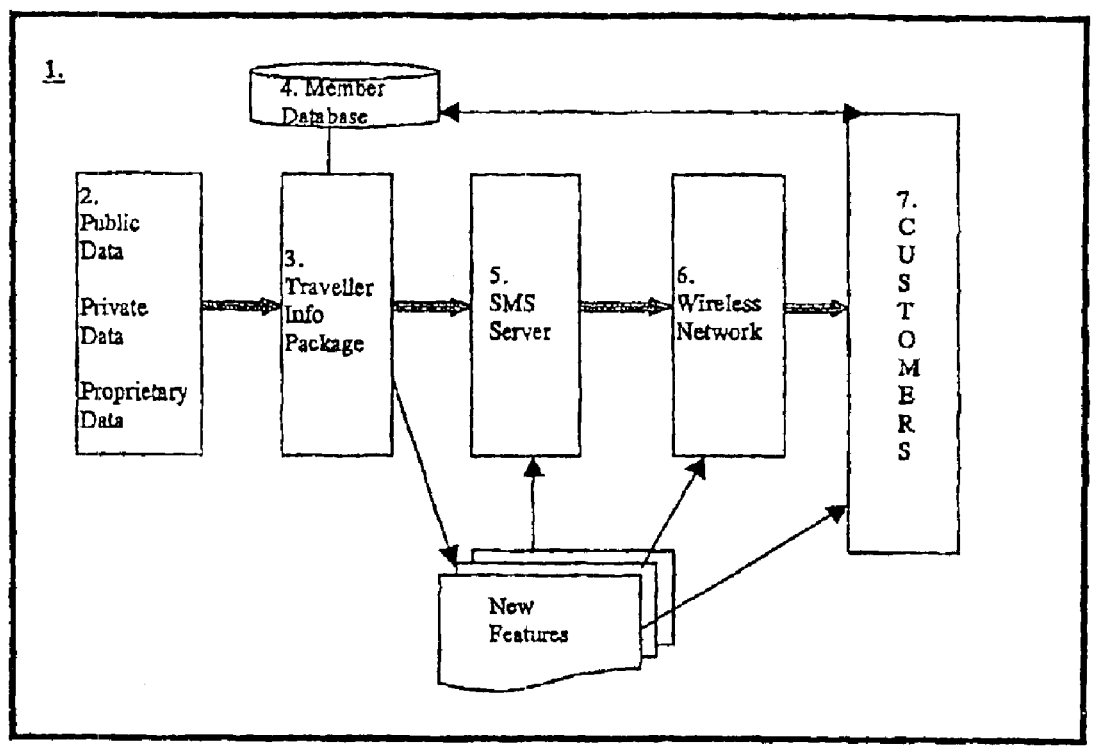
FIG. 1 is a schematic diagram of an embodiment of a traffic information system in accordance with the present invention.

Referring now to FIG. 1, there is shown a schematic diagram of one embodiment of a traffic information system 1 of the present invention. In the instance of the preferred embodiment, the system includes the means for sending customised traffic information directly to travellers who have subscribed to receive such information. Of course, the system could provide the customised information to a third pat information distributor who in turn effects the distribution of the customised information to individual subscribers.

The system of FIG. 1 includes various sources 2 for providing real time traffic related data and associated data. These sources 2 may include publicly available data, private data or proprietary data. A database 3 stores historical traffic data. The database 3 interfaces with sources 2 to receive real time traffic data and associated data. The database 3 also includes means for integrating historical, real time and associated traffic data including means to perform a statistical analysis of the data, and is adapted to produce customised traveller information packages.

A member or subscriber database 4 stores travel profiles for individual subscribers which are consulted when producing traveller information packages for individual subscribers 7. An SMS server 5 provides a gateway between the database 3 and a wireless network 6, such as a mobile or GSM network.

The subscriber 7 has mobile communications means, such as a mobile phone which is operable to receive data transmitted via the mobile network 6. In the preferred embodiment, customised text messages are received on the subscriber's phone regarding relevant traffic information according to the subscriber's travel profile. The subscriber 7 maybe provided with access to his profile stored in the subscriber database 4, via the Internet or other access means. This provides the subscriber 7 with the opportunity to edit and alter his travel profile.

The various sources 2 of data generally provide real time traffic related data. Such sources can include highway loop detectors, video cameras, publicly and privately owned sources, and vehicles fitted with GPS devices having radio or mobile communication devices for transmitting data relating to the progress of the vehicle through the traffic network. Additionally, air surveillance may be used as well as general media reports.

The interface between the database 3 and the sources 2 of data include automatically collected public information from various web sites such as weather forecasts and other visual and voice information which are received and keyed in by operators to add to the automatically collected information.

Integrating Historical, Real Time and Associated Traffic Data

The database 3 incorporates software to integrate and process historical traffic data and any real time data with respect to a subscriber's travel profile. Numerous techniques are available for such processing. The software in the preferred embodiment is written in Perl and in one embodiment, the software operates on a PC using the Linux operating system.

Referring to Table 1, there is shown an example of the type of information stored in the database 3.

TABLE 1

| No. | Suburb | Depart | Entry | Entry Time | Exit | Exit Time | Destn |
|---|---|---|---|---|---|---|---|
| 1341 | Box Hill | 6.30 | MDL | 7.05 | HOD | 7.20 | BMDS |
| 1342 | Donvale | 6.40 | SPR | 6.47 | HOD | 7.20 | SUN |
| 1343 | N. Balwyn | 6.40 | BUL | 6.50 | HOD | 7.10 | CBD |
| 1345 | Kew | 6.40 | BRK | 6.50 | HOD | 7.20 | CAR |
| 1345 | S. Wantirna | 6.45 | SPR | 7.00 | HOD | 7.30 | CBD |
| 1346 | S. Wantirna | 6.45 | SPR | 7.00 | HOD | 7.30 | CBD |
| 1347 | Wheelers Hill | 6.50 | WEL | 6.55 | PNT | 7.35 | BMDS |
| 1348 | Wheelers Hill | 6.50 | SPR | 6.55 | HOD | 7.50 | BMDS |
| 1349 | E. Doncaster | 6.50 | DON | 7.00 | HOD | 7.30 | ABB |
| 1350 | Balwyn | 7.00 | CHN | 7.10 | HOD | 7.30 | BMDS |
| 1351 | Glen Waverley | 7.00 | BILK | 7.10 | HOD | 7.45 | CBD |
| 1352 | Rowville | 7.00 | WEL | 7.10 | PNT | 8.00 | BIRD |
| 1353 | Rowville | 7.00 | WEL | 7.10 | PNT | 8.10 | BMDS |
| 1354 | E. Doncaster | 7.00 | BILK | 7.12 | HOD | 8.00 | BMDS |
| 1355 | Rowville | 7.00 | WEL | 7.15 | PNT | 8.20 | CBD |
| 1356 | Greensborough | 7.00 | BRK | 7.20 | HOD | 7.50 | CBD |

In this instance, real time data has been integrated with historical data to produce predicted travel times for given routes. The example relates to travel from outer suburbs to the Monash freeway in Melbourne, Victoria. By way of illustration, the entry number 1345 will be considered as an example. The information contained in this entry enables the system to predict that departing South Wantirna at 6.45 am will mean entry onto the freeway at around 7.00 am via the Springvale entrance. Exit at Hoddle St is forecasted to be at 7.30 am. The information contained in the database 3 may be continually updated.

Referring again to FIG. 1, the SMS server 5 receives customised messages from the database 3 in the form of e-mails. The e-mails contain the customised forecasted traffic information for the individual subscribers 7. The forecasted travel time information, incidents and weather information is delivered via the SMS server 5 over the mobile network 6 to the mobile phones of the subscribers 7. The forecasted information can be delivered during various time windows such as the night before, just prior to commencement of the journey, en-route or just before bifurcation point offering the choice of alternative routes to the destination. Subscriber profiles contained in the subscriber database 4 determine the frequency and time of the forecasted information being delivered.

Table 2 illustrates a snapshot of customised messages generated and delivered to individual subscribers.

TABLE 2

| | | |
|---|---|---|
| Nov. 23, 1999 | 07:16:01: | establish ppp link |
| Nov. 23, 1999 | 07:16:03: | sending Sathish, APPROX 22 mins TO PNT to 0414123456@trial.epus.com.au |
| Nov. 23, 1999 | 07:16:04: | sent 1 mail messages |
| Nov. 23, 1999 | 07:21:07: | sending Grant, APPROX 16 mins TO HOD to 0414234567@smsa.erics.com.au |
| Nov. 23, 1999 | 07:25:30: | Processing Eastern + Freeway |
| Nov. 23, 1999 | 07:25:31: | Processing Monash + Freeway |
| Nov. 23, 1999 | 07:25:31: | Processing West + Gate + Freeway |
| Nov. 23, 1999 | 07:26:12: | sending Tracey, APPROX 13 mins TO HOD to 04191234561@cfsms@ericn.com.au |
| Nov. 23, 1999 | 07:31:17: | sending Michael, SPR -> HOD 19 mins to 0415987654@semes.epa.com.au |
| Nov. 23, 1999 | 07:31:19: | sent 3 mail messages |
| Nov. 23, 1999 | 07:38:23: | sending George, JAC -> PNT 28 mins to 0419123451@xyz.spanyb.com.au |
| Nov. 23, 1999 | 07:41:28: | sending Geoff, APPROX 15 mins TO HOD to 0414333444@abc.eric.com.au |
| Nov. 23, 1999 | 07:41:38: | sent 2 mail messages |

For example, the message sent to Sathish at 7.16 am forecasts that it will take him 22 minutes to reach Punt Rd. Similarly, for Grant, the message at 7.21 am forecasts that it will take him 16 minutes to reach Hoddle St. Typically these messages are sent to the subscribers prior to the commencement of their journey.

For example, the subscriber who leaves home from Rowville at 8.00 am and enters the Monash freeway at Wellington Rd at approximately 8.15 am would get a standard forecasted traffic information message at 7.55 am. If an incident occurs between 7.55 am and 8.15 am, a further message is sent via the mobile phone to that subscriber before he enters the freeway. In this way, the subscriber is informed at critical times of the traffic situation on his route of travel thus enabling subscriber to alter their normal travel route in an attempt to avoid delays caused by the incident.

Further down the table, there are three entries which show the processing of traffic information on the freeways. This illustrates the operation of integrating real time data with historical data to provide forecasted information. The processing is conducted periodically or when updated real time data is received in the database.

Figure 2:
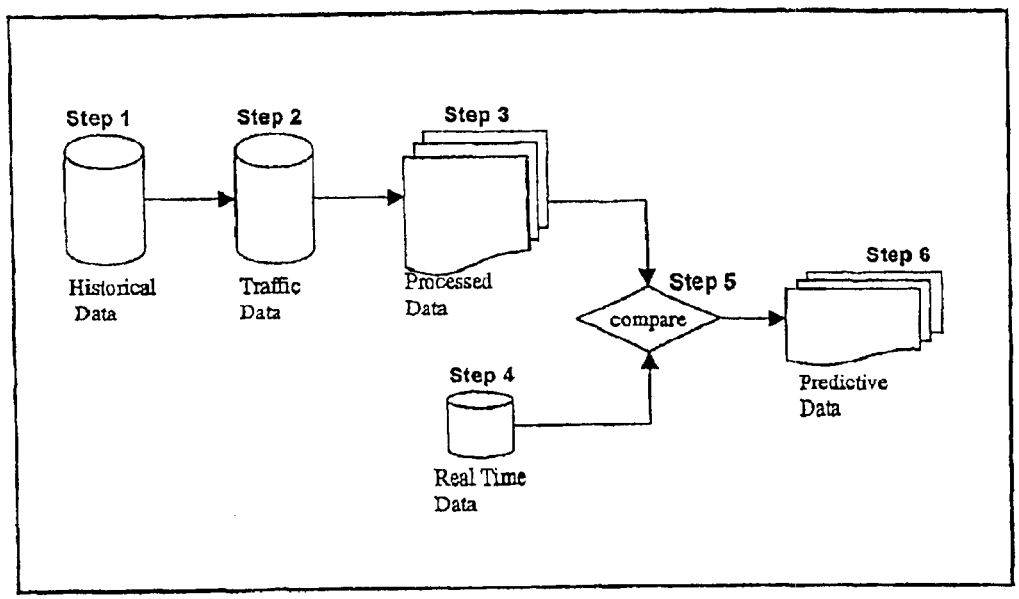
FIG. 2 is a flow diagram illustrating an embodiment of the traffic forecasting process in accordance with the present invention.

Referring to FIG. 2, there is shown a process flow diagram of one example of the traffic forecasting process employing statistical modelling. The process flow includes the following steps:

Step 1: Obtain an accumulated series of historical data which could be in the form of continuous 2–10 minute averages of delay in various geographical locations thus forming a series of historial dealys in time steps.

Step 2: Using conventional spectral methods, seasonal trends in the historical data are obtained and removed from the historical data and the result output and tabled as Traffic data.

Step 3: Obtain historical weather data and splice it with the remaining unaltered traffic data so that for each entry in the traffic data table, columns of a) Days since last rain ($D_r$); and b) Rainfall in last 3 hours (R) are added. Then add columns to the previously output traffic data table to indicate whether the data is in some or all of:
  i) School holiday period ($S_h$=0 or 1)
  ii) Common summer holiday period ($C_h$=0 or 1)
  iii) Weekend/weekday ($W_e$=1/0)
  iv) Public Holiday or day before/after ($P_h$, $P_h^-$, $P_h^+$)

The above variables are examples of associated traffic data that relates to the types of events that can be modelled into the process and similarly, other variables may be entered as well. By adding the additional columns described, the effect of weather patterns relating to the various events and certain time periods are added to the Traffic data table.

To generate a model of the historical data suitable for predictive analysis, the traffic data is divided into seven files corresponding to each day of the week. The data in each file is combined by averaging which represents 15 minute or 30 minute averages depending on what frequency is required. Typically, 30 minute periods will be sufficient. So in operation, for example, consider the average delay at 8:30 am on a Monday morning. The representative delay data for a particular or given route of travel comprises the individual delays for the intersections and/or freeways, referred to as links, on that route at the expected commencement time for each link of the route. The average delay for each link for the 30 minute period between 8.30 am to 9.00 am, is obtained from a time average of two minute intervals over the 30 minute period. The sample interval of two minutes is a continuous stream of data obtained from sensors or the like at freeways, intersections, etc. The interval period maybe varied depending on the frequency that is required.

All such average delay data gathered for 8:30 am on a Monday morning, are grouped into a separate file and a least squares fit of the data is performed using the function:

$$\text{Delay} = a_0 + a_1 * D_r/(a_2 + D_r) + a_3 * R/(a_4 + R) + a_5 * S_h + a_6 * C_h + a_7 * W_e + a_8 * P_h + a_9 * P_h^- + a_{10} * P_h^+$$

where:
  $D_r$: Days since last rain
  R: Rainfall in last three hours
  $S_h$: School holiday period
  $C_h$: Common summer holiday period
  $W_e$: Weekend/weekday
  $P_h$: Public holiday
  $P_h^-$: Day before public holiday
  $P_h^+$: Day after public holiday In the preferred embodiment, the above modelling is performed for each 30 minute period of each day for seven days. This generates 336 sets of the 10 coefficients ($a_0$ to $a_9$) which describe the historical data for each link. Whilst not necessary, the use of a model to describe the historical data should result in a reduced primary and secondary storage requirement as compared with storing all the available averaged historical data in RAM. Where a model is used, it is expected that the model would be regenerated every six months or so. In the instance of the preferred embodiment, the least squares fit analysis would be executed every six months to generate a new 336 sets of the coefficients ($a_0$ to $a_9$) for each link.

Step 4: Obtain real time data from various sources relating to measured link delays of the network and associated data relating to the actual weather conditions for the links in the network.

Step 5: For each link in the network, determine the historically expected delay based upon the seasonally adjusted historical delay and the measured weather conditions and compute for each link the ratio of the most recently measured delay for the link to the historically expected delay for the link at a time step corresponding to the measured delay. This ratio is labelled "JVL".

Step 6: When predicting the expected delay from a commencement node to a destination node, determine the historically expected delay for each link as it would be at the expected commencement time for each link and multiply the historically expected delay for each link of the route by the link's corresponding JVL ratio prior to summing the historically expected delays on each of the links to thus form a predicted expected delay for travel from the commencement node to the destination node.

Incidents that affect the expected travel delay on a traffic link in a network are entered manually into a database by an operator. Due to the wildly varying nature of incidents, the expected delay that will occur to traffic on an affected link is necessarily reliant upon the estimation of a human observer. The observations of incident observers and the expected link delays resulting from incidents are entered into a database that the integrating means accesses on a regular basis to update the database of historically expected link delays. In another embodiment, the expected delays to traffic links caused by incidents may remain in a separate database as compared with the database of historically expected link dealys and the two databases may be accessed at the time of providing a predicted actual delay for a traveller travelling from a commencement node to a detination node in the network. Over time, as further observations are received regarding incidents, the incident database may be updated to reflect any change in the expected delay caused by the incident.

In the preferred embodiment, the incident database is accessed every time a traveller profile causes the prediction and transmission of the travel delay for the subscriber.

Optimal Path Through Traffic Network

In a preferred embodiment of the invention, the customised forecasted traffic information system includes the determination of an optimal path through the traffic network for the subscriber to reach his or her destination in the least time. The search for the optimal path through a traffic network takes account of each link flow direction and the various different delays caused by traffic control signals to traffic movement through each intersection as well as operator input and other automatic data feeds.

Figure 3:
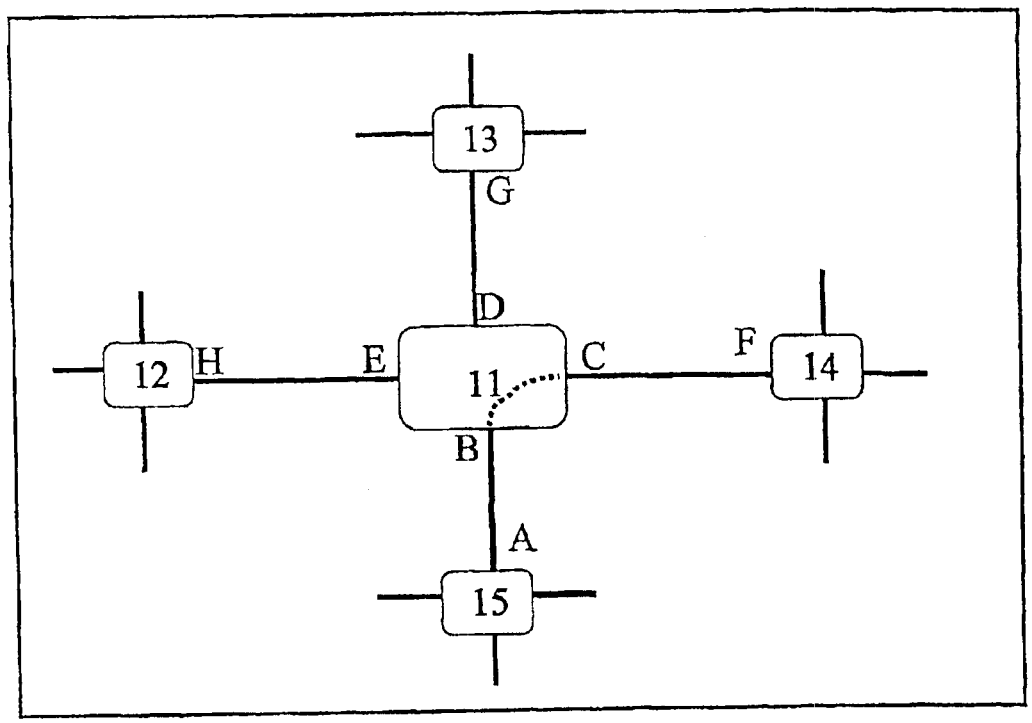
FIG. 3 is a diagrammatic representation of a typical traffic intersection identifying travel links and individual traffic flows.

With reference to FIG. 3, a diagrammatic representation of a traffic intersection 11 is provided with incoming/outgoing links connecting it to intersections (nodes) 12, 13, 14 and 15. The links may be bi-directional and there may be more nodes connected to node 11 than detailed in FIG. 3. In general, traffic arriving at B (or the queue terminating at B) will take different times to move through the intersection to C, D or E. These times will be dependent upon the congestion on each of the links and the traffic signal settings at intersection 11.

For the purposes of this specification, the term "degree of saturation" (DOS) is used to refer to the ratio of the actual flow of traffic movement resulting from a particular traffic signal as compared with the maximum possible flow of traffic resulting from that signal. DOS is a measure of the intersection congestion and may, under some circumstances, be transformed to a delay in seconds for the particular movement.

For the purposes of this specification, the term "mean free travel time" is used to refer to the travel time down a link when all traffic control devices are removed.

Figure 4:
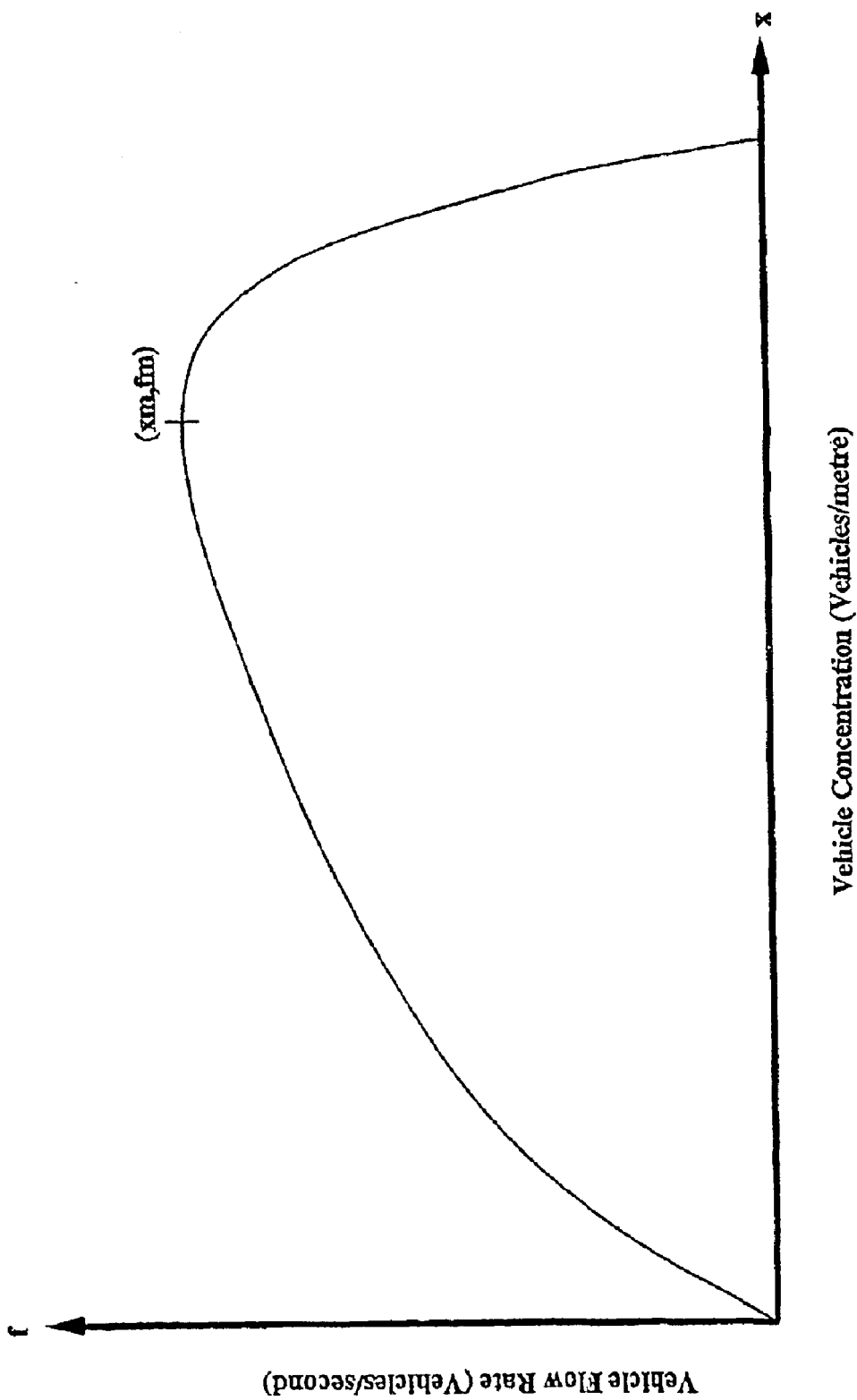
FIG. 4 is a diagrammatic representation of a typical relationship between vehicle flow and vehicle concentration for a typical tic link.

With reference to FIG. 4, a typical relationship between vehicle flow and vehicle concentration is detailed for a typical traffic link. As will be noted from FIG. 4, the relationship is a convex curve intersecting the vehicle concentration axis at a vehicle concentration and saturation of zero. A value for the "mean free speed" for the traffic link may be determined from FIG. 4 by dividing the vehicle flow (expressed as vehicles per second) by the corresponding concentration (expressed as vehicles per meter). As it will be recognised by those skilled in the art, the "mean free speed" is a difficult quantity to determine.

In a preferred embodiment of the invention, the mean free vehicle speed down each link of a carriageway is obtained from the relationship between vehicle flow rate and vehicle concentration for various different classes of roads (e.g. freeways, arterials, suburban streets). FIG. 4 also details the point at which saturation flow on a tic link occurs ($x_m$, $f_m$).

Figure 5:
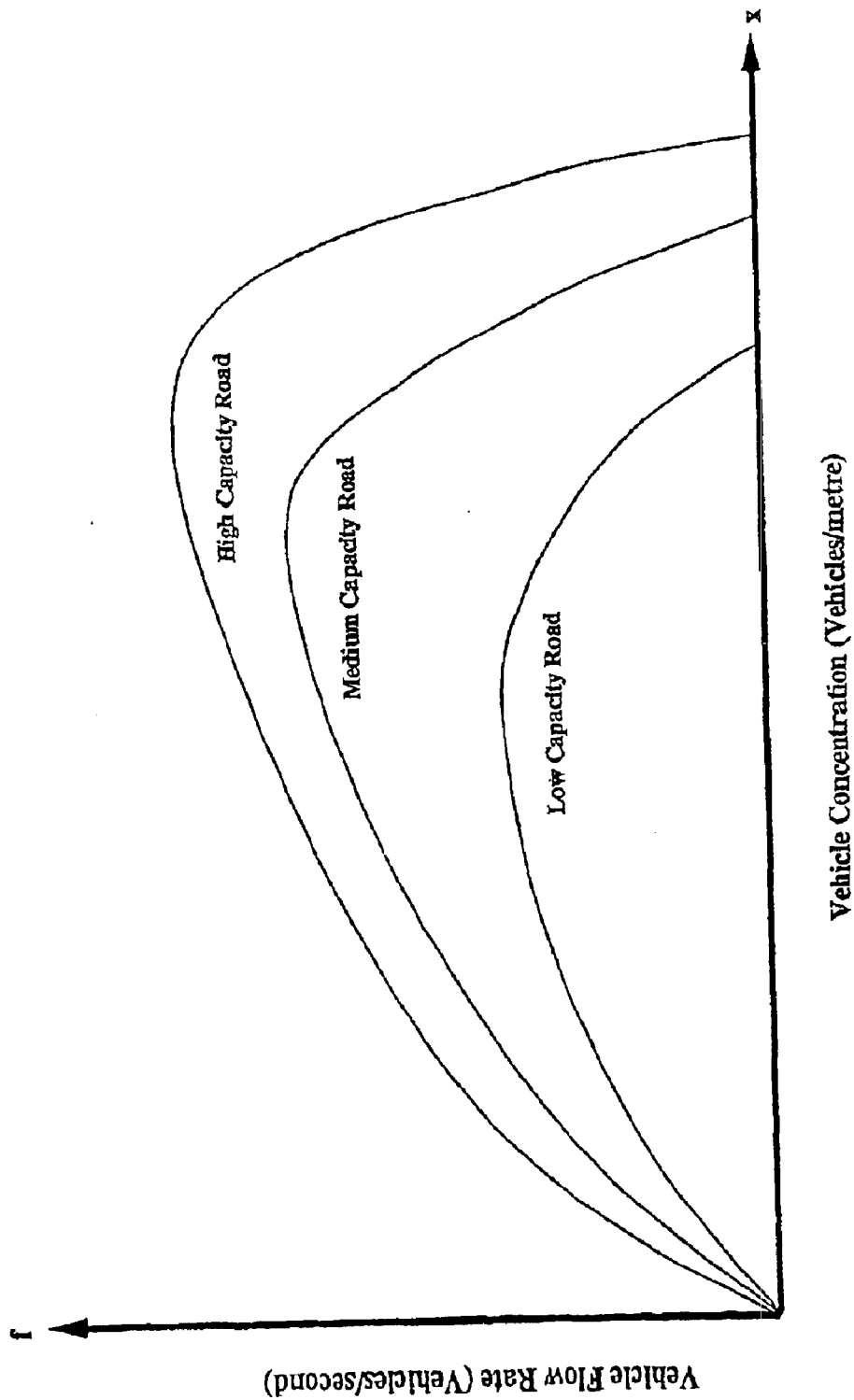
FIG. 5 is a diagrammatic representation of typical relationships between vehicle flow rate and vehicle concentration for various different classes of roads.
Figure 6:
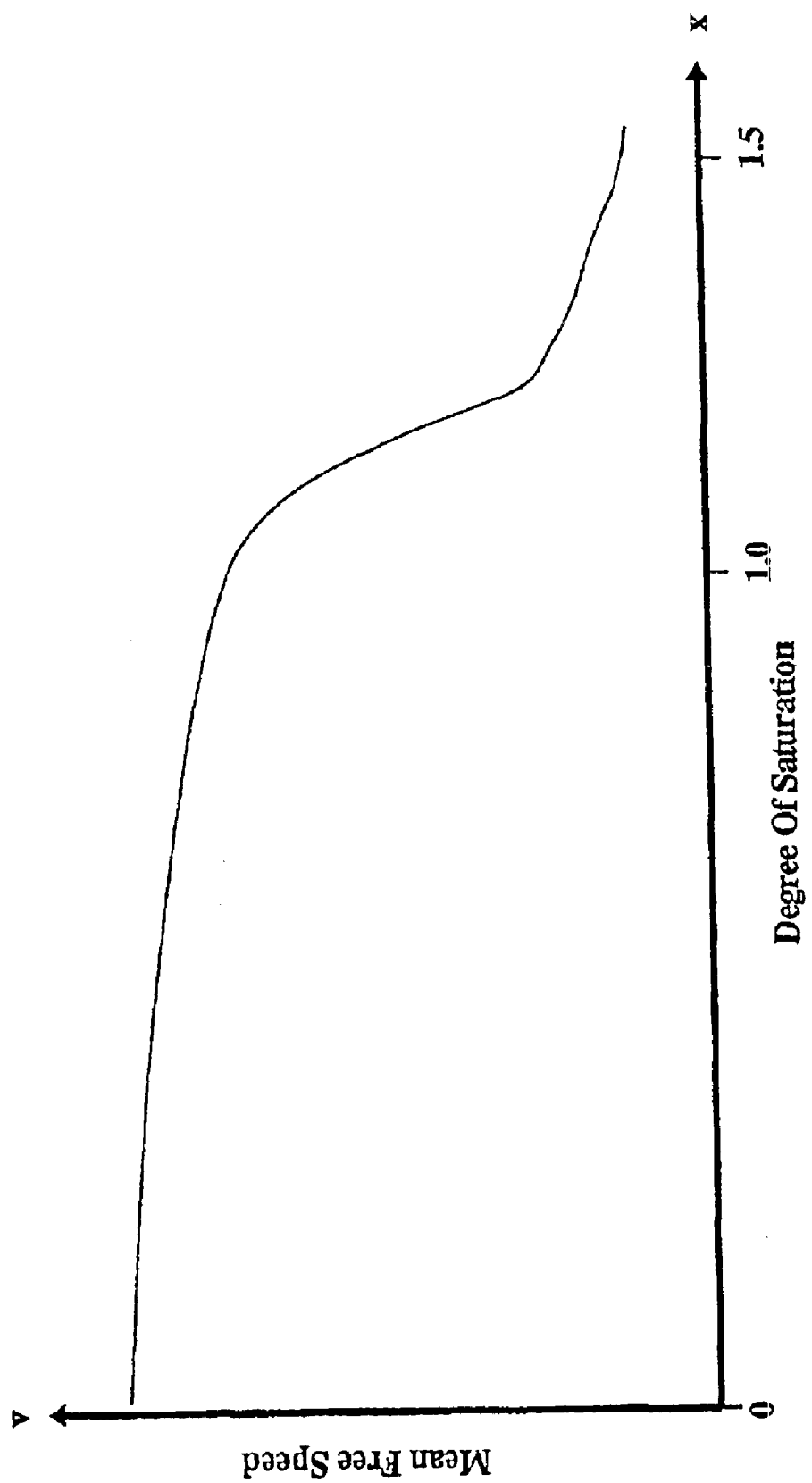
FIG. 6 is a diagrammatic representation of the relationship between mean free vehicle speed and degree of saturation as derived in an embodiment of the invention.

Typical relationships are detailed in FIG. 5 for different classes of roads. It is also preferable to determine a further relationship between vehicle concentration and degree of saturation. Since the DOS is directly proportional to vehicle flow, the vehicle flow may be deduced from the DOS. For vehicle flows less than the saturation flow on a link (ie less than $f_m$ in FIG. 4), the mean free speed maybe calculated by dividing the flow (deduced from the DOS) by the corresponding concentration. For vehicle flows greater than the saturation flow, corresponding to higher DOS, the vehicles experience a rapid decrease in mean free speed to close to zero. The relationship between mean free speed and DOS is shown in FIG. 6. The actual relationship beyond the Degree of Saturation corresponding to saturation flow may be obtained from experiment. Accordingly, the DOS can be used to estimate a flow rate which can be divided by the vehicle concentration to provide the mean free speed.

A model of travel time from A to B to C to F is to sum the un-congested travel times from A to B and C to F with the delay in the movement B to C. The un-congested travel times are the mean free travel times. These times can be calculated from mean free travel speeds, which are generally constant for all roads of a particular type, and the link length. Computationally, it is convenient to define a link travel time as the mean free travel time plus the time to negotiate the immediate upstream intersection. That is, the travel time on link BCF is the mean free travel time on link CF plus the time to negotiate the movement BC. The latter may be computed from quantities transmitted by the traffic control system at regular time intervals (eg 1 minute). For example, in the SCATS (Sydney Co-ordinated Adaptive Traffic System) traffic control system, the variables needed for the calculation of intersection movement delays are:

Date/Time

Intersection Strategic Approach number (e.g. a link number)

Regional Computer name/number (the identity of the computer providing data)

Sub System number

Green signal time for the strategic approach

Signal cycle time for the strategic approach

DOS for the strategic approach

Defining link travel times as described above means that traditional optimal path searching methods, for example Dijkstra, may be used. However, it also means that there are several travel times associated with each particular link. For example, the travel times associated with each link comprise the times for intersection movements BC, EC, DC and CFC (a U turn) added to the mean free travel time down link CF, that is, four link travel times.

Generally, if there are n links joined at a node, there are n*n travel times associated with that node. When conducting a search from a given node for the next node in the optimal path, the upstream node on the path to the current node needs to be known, in order that the correct link travel time to the new node can be computed.

In the preferred embodiment of the invention, for each different time of day at which an optimal search is conducted, the link travel times are stored in a single continuous vector. Another vector includes indices of the first vector where information about the delays through a particular node can be found.

For example, suppose NCOST is a vector of travel times and NINDEX(nn) is the index of intersection nn at which link travel times start in NCOST. If there are k links joining at intersection nn, then the link travel times for links joining node nn occupy positions NINDEX(nn) to NINDEX(nn)+k*k−1 in vector NCOST. Specifically, if i=(NINDEX(nn)+j*k−1+n) with j<k and n<=k, then NCOST(i) is the delay between node nn and the j'th downstream node given that traffic entered node nn from upstream node n. This approach is a relatively efficient method of storing link delays which is updated easily as new intersection delays become available.

It is only necessary to store single connections between nodes since the travel time on CF given that arrival at node 1 was via AB occupies a different position in the vector NCOST than the travel time on BA given that arrival at node 1 was via FC. Bi-directional flow is handled in this way.

In practice, NCOST may be two dimensional, the first dimension referring to the time of day and the second referring to link delays as described above. For example, if the system is running on 10 minute average data from traffic control signals, the first dimension will be 144, as there are 144 separate 10 minute periods in a day.

Traffic incidents like road-works, temporary/permanent road closures and accidents can be handled in the above scheme by entering a very large link travel time in the appropriate position of NCOST for the known or estimated time of the incident. In the case of uni-directional links, a very large link delay may be entered permanently in the position of NCOST which relates to the illegal movement direction.

Most incidents will be handled by an operator typing codes relating to the incidents into a file. The computer program will read the file regularly (eg, every 5 seconds) and update NCOST. If an incident has occurred and the delays on appropriate links have been set to large values, the data coming from the traffic control system can be compared with historical data for the part of the network affected by the incident. As the incident is cleared, the dynamic data will return to "normal" and the large link delays can also be returned to normal values. The dynamic data thus provides a feedback path to the incident detecting operator.

Historical data from the traffic signals should be collected so that there exists a complete 24 hour typical data set for each day of the week. Before collecting this data, the minimum sampling period should be determined (eg 10 minutes). At the start of a given day, the relevant data set should be loaded into NCOST.

As each day progresses, the system should collect the current signal data, process it in a form suitable to fill the relevant time slot of NCOST and archive it for off-line modification of the historical database.

When a request for an optimal or fixed trip time is received, the link delays collected from the last few periods of traffic signal data may be compared with the corresponding historical data, and estimates may be made of each element of complete vectors of NCOST for the following n time steps using various methods including:

Time series analyses

Exponential weighting

Direct multiplication of the historical values by the ratio of the currently available delay to the historical delay for each link delay.

Incidents are added and removed if necessary by an operator dynamically. Incident reports may be received by voice and the essential information extracted electronically using voice recognition techniques and transferred to the database of incident reports.

The preferred embodiment of the invention recognises that at the time a trip starts, the link delays part way through the trip are not the delays at that same start time. As the search method proceeds, the elapsed time to each node in the trip is computed and the vector of NCOST appropriate for that particular time is used when computing the next link delay in the trip. Clearly, in the absence or failure of a dynamic data feed, historical data can be used, but as dynamic data becomes available, it can be used to modify the succeeding vectors of historical data in NCOST to reflect current traffic conditions. From the known origin and destination of the trip, an approximate estimate of the trip travel time can be made using pessimistic mean travel speeds appropriate to the time of day. This is then used to estate the number of time periods in NCOST over which a prediction must be made.

Although the preferred embodiment has been described in relation to the SCATS system, it is conceivable that the present invention may be readily adapted to receive and utilise data that is collected by alternative traffic control systems such as the SCOOT (Split Cycle Offset Optimisation Technique) system.

Predicting Traffic Network Movement Delays

Some traffic control systems are unable to provide a completely updated set of movement delays at each intersection in less than one hour. However, they can update perhaps ten per cent of the intersections of the traffic network in less than ten minutes. By carefully choosing the intersections from which to collect traffic data, this data may be matched to the remaining intersections for which timely data is not available.

The intersections chosen for data collection must cover the geometry and capacity range of the intersections for which timely data is not available. One measure of capacity is average DOS over a day. Historical data allows collection of appropriate data and calculation of this quantity for all intersections. Any two prospective matches should have similar DOS. Similarly, if historical green signal times and signal cycle times are available, daily averages of these can also be used for matching pairs of intersections.

Any two matched intersections preferably have the same number of intersecting links. For data matching purposes, the orientation of intersections are preferably arranged such that the links closest to pointing to the Central Business District are aligned. In addition, both intersections should preferably be as close as possible to being the same distance from the Central Business District.

All of the above matching criteria are available "off line". That is, they can be applied to the system if only the network geometry and appropriate historical data are known. The more matching factors that can be applied, the more accurate the match between the intersections will be. In the preferred embodiment, the criteria of matching numbers of links, distance from the Central Business District and orientations with respect to the Central Business District are always used. Once matches are determined, collected intersection data maybe exported to matching intersections, providing a full set of traffic data for an entire network.

With respect to the matching process, it is interesting to note that errors in link delays tend to cancel out over trips that traverse a large number of links.

If traffic data is available for a portion of one city but none is available for another city that has similar traffic flow characteristics to the first, intersection matching using some of the attributes discussed above can be performed to estimate the traffic data in the city for which no traffic data exists. Local knowledge in the city to be matched may allow classification of the intersections by "busyness" which may be equated to ranges of the average daily DOS values for the intersections in the city where data has already been collected. It is then possible to estimate travel times throughout the day in the new city. This approach allows a travel time advisory system to be established in any city for which traffic characteristics are known to be similar to those in a city already operating such a facility. Over time, appropriate data may be collected in the "new" city to improve the historical database. Ideally, this historical data needs to be supplemented with dynamic data from floating or seeded vehicles in order to be able to provide genuine real time traveller information. In any event, applying a traffic data matching process at least enables a first estimate to be established for a city with no actual available traffic data.

Alternative Means for the Delivery of Traffic Information

Alternative means for delivering the messages may include text to voice conversion. The forecasted traffic information can be converted into speech and transmitted either as a voice call or if not answered, then left as a voice message for subsequent retrieval. In another form, traffic information from the database can also be made available through a menu based interactive voice response (IVR) system. Furthermore, HTML text can be truncated to more basic WML text suitable for display on WAP and/or 3G mobile phones.

Referring again to FIG. 1, in an alternative arrangement, positional data for individual subscribers 7 can be determined and related to the server 5. A GPS, MPS or other suitable positioning system can be employed to determine the exact position and status of an individual subscriber. If the subscriber alters his travel departure time, his customised messages can be dynamically updated based on his current status as determined by his positional data. Subscribers can also request specific information as required. The service invoked in an SMS protocol is known as "push" and "pull" messages. A push/pull service is where an SMS message is sent from a subscriber's phone requesting traffic information (a pull) and an SMS message is sent (a push) in return with the required information. Subscribers may also access a dedicated web-site which has information for the general public as well as specific access for the subscribers. The subscribers can alter their profiles as they desire. The types of information contained within a subscriber profile may include the subscriber's expected time of departure, primary and alternate routes with which the subscriber is familiar and the subscriber's preference for weather forecast information.

CONCLUSION

The method and system of the present invention embodies many advantages and it will be appreciated by persons skilled in the art that numerous variations and/or modifications may be made to the invention as shown in the specific embodiments without depart from the spirit or scope of the invention as broadly described. The present embodiments are, therefore, to be considered in all respects as illustrative and not restrictive.

What is claimed is:

1. A system for providing traffic-related information comprising:
   a database storing historical traffic data and being operable to receive substantially real time traffic data and associated data;
   means for deterministically integrating the historical and real time traffic and associated data with respect to at least one traveler profile to produce customized forecasted traffic information with respect to the at least one traveler profile; and
   means for sending the customized forecasted traffic information to an intended recipient wherein the customized forecasted traffic information comprises at least a predicted travel delay for at least one travel route described in the at least one traveler profile,
   wherein, if insufficient traffic data for a link of the travel route is present, the means for integrating is operable to use available data in respect of a further link in place of the insufficient traffic data on said link of said travel route in order to provide the predicted travel delay.

2. The system according to claim 1, wherein each of said travel route link and said further link include a traffic intersection, such that available traffic data in respect of the traffic intersection of said further link is used in place of insufficient traffic data in respect of the traffic intersection of said travel route link.

3. The system according to claim 2, wherein matching the suitability of said further link to said travel route link takes account of one or more of the following:
   a) geometry of said intersections;
   b) orientation of said intersections;
   c) the relative DOS of said intersections;
   d) historical daily averages for signal cycle times for said intersections;
   e) distance of said intersections from locations of relatively high population density.

4. The system according to claim 1, wherein the intended recipient receives the customized forecasted traffic information for all traveler profiles and separates the information relating to each traveler profile for subsequent transmission to individual travelers according to their profile.

5. The system according to claim 1, wherein at least one individual traveler, having a traveler profile, has a remote terminal operable to receive transmitted customized forecasted traffic information.

6. The system according to claim 5, wherein the remote terminal is operable to transmit information to the database.

7. The system according to claim 5, wherein the remote terminal is a mobile phone.

8. The system according to claim 5, wherein customized forecasted traffic information is transmitted to a traveler prior to the commencement of a traveler's journey.

9. The system according to claim 5, wherein customized forecasted traffic information is transmitted to a traveler during the traveler's journey.

10. The system according to claim 5, including a traveler database for storing individual traveler profiles, the traveler profiles including data identifying the traveler and data relating to the travelers usual travel routes and usual time of commencement on those routes.

11. The system according to claim 9, wherein the traveler's profile indicates the times that the traveler prefers to receive customized forecasted traffic information.

12. The system according to claim 10, wherein individual travelers are provided access to the traveler database and may alter data contained in the database relating to their profile.

13. The system according to claim 10, wherein the means for integrating historical, real time and associated traffic data are operable to:
   a) determine a time series of average delays from historical data for links in a traffic network the time series extending over a predetermined period of time;
   b) receive historical weather data and correlate that weather data with the historical traffic data and generating an average historical delay for the links during various weather conditions;
   c) receive real time data relating to weather in the geographic region of the traffic network;
   d) estimate the actual link delays that will occur on each of the traffic links for each of the time series based upon the received data; and
   e) generate a prediction of the actual delay from a commencement node to a destination node of the traffic network by summing the respective link delays of the links along the travel route using the estimate for each link delay at the time the traveler is expected to commence travel along those links.

14. The system according to claim 13, wherein the integrating means determines seasonal trends in the historical traffic data relating to average link delays and removes those seasonal trends from the historical traffic data.

15. The system according to claim 13, wherein the integrating means estimates the actual traffic link delay that will occur for a link some time in the future by receiving real time traffic data relating to measured delays on traffic links and calculating the ratio of the most recently measured traffic link delay to the average historical link delay for the corresponding time step at which the measurement was taken and multiplying the average historical link delay for the link at a future time step with the previously established ratio thus generating an estimate of the actual link delay that will occur for the link at the time step in the future.

16. The system according to claim 15, wherein the integrating means generates an estimate of the actual traffic link delay that will occur for a link some time in the future for all traffic links of the network relevant to traveler profiles.

17. The system according to claim 16, wherein the integrating means estimates travel time on a particular link on the basin of prior links to said particular link that have been traversed and taking into account the delay involved with traversing said prior links and the intersections traversed.

18. The system according to claim 13, wherein the integrating means determines predictions of actual delay that will occur for travel routes according to traveler profiles at the times required by each respective traveler profile.

19. The system according to claim 13, wherein the integrating means receives data relating to events such as school holiday periods, summer holiday periods, public holidays and weekends and correlate that data with the historical traffic data.

20. The system according to claim 13, wherein the integrating means includes a model of that data generated by performing a lease squares fit analysis to determine an average historical traffic delay using the function:

$$\text{Delay} = a_0 + a_1 * Dr/(a_2 + Dr) + a_3 * R/(a_4 + R) + a_5 * Sh + a_6 * Ch + a_7 * We + a_8 * Ph + a_9 * Ph^- + a_{10} * Ph^+$$

where

Dr represents period since last rain

R represents rainfall in last predetermined period

Sh represents school holiday period

Ch represents common summer holiday period

Wc represents a weekend or weekday

Ph represents a public holiday $Ph^-$ represents a day before a public holiday $Ph^-$ represents a day after a public holiday.

21. The system according to claim 13, wherein estimates of link delays caused by incidents are received and stored for subsequent access by the integrating means for summing with the historically expected link delays when predicted travel delays are generated.

22. The system according to claim 13, including a means for determining an optimal path of travel through a traffic network, the means being:
  a) operable to determine link travel time for each traffic link in a network; and
  b) operable to implement a path searching method to determine the optimal path between two nodes in the traffic network, the optimal path being the series of connected traffic links between the two nodes resulting in the least expected delay.

23. The system according to claim 22, wherein the determination of a link travel time for a traffic link in a network is obtained by summing the mean free travel time for that link and the average time required to negotiate the immediate upstream intersection connected to that link.

24. The system according to claim 23, wherein the traffic links with vehicle flow rates less than the saturation flow rate, the mean free travel speed is obtained by dividing the vehicle flow rate for that link by the vehicle concentration for that link, and the mean free travel time is obtained by dividing the distance of the link by the mean free travel speed.

25. The system according to claim 23, wherein the average time to negotiate an immediate upstream intersection is obtained from the traffic network's traffic control system.

26. The system according to claim 22, wherein upon receiving a request to provide an optimal travel path through a traffic network, measured link delays most recently collected from traffic signal data are compared with historical link delay data and an estimate of the actual link delay data is generated for each traffic link in the network for an appropriate number of steps in the time series according to the traveler's commencement and destination nodes in the network.

27. The system according to claim 26, where, in the even that real time link delay data for a traffic link is not available, historical link delay data is used.

28. The system according to claim 26, where there is insufficient historical traffic data for links in a traffic network to generate historical link delay data; the means for integrating historical and real time data uses available traffic data for other links in the same and/or different network as estimates for those various links for which there is no data available.

29. The system according to claim 28, wherein the traffic links for which no traffic data is available are matched to other traffic links for which no traffic data is available, the matching process taking account of one or more of the following
  a) the relative geometry of the traffic links;
  b) the relative arrangement of the traffic links;
  c) the relative capacity of the traffic links;
  d) the relative alignment of the traffic links with locations of relatively high population density;
  e) the relative DOS of the traffic links;
  f) the relative distance of the traffic links from locations of relatively high population density.

30. The system according to claim 28, wherein traffic data available for a portion of a city or urban area is matched to another city or another urban area having similar traffic flow characteristics to the first mentioned city or urban area and no available traffic data, in order to estimate the traffic data in said another city or said another urban area.

31. A method of providing traffic-related information comprising the steps of:
  a) storing historical, real time and associated traffic data in a database;
  b) deterministically integrating said historical, real time and associated data with respect to a traveler profile to produce customized forecasted traffic information with respect to the traveler profile; and
  c) sending the customized forecasted traffic information to an intended recipient wherein the customized forecasted traffic information comprises a predicted travel delay for a travel route described in the traveler profile;
wherein, if insufficient traffic data for a link of the travel route is present, the step of integrating comprises using available data in respect of a further link in place of the insufficient traffic data on said link of said travel route in order to provide the predicted travel delay.

32. The method according to claim 31, further comprising the step of, where each of said travel route link and said further link include a traffic intersection, using available traffic data in respect of the traffic intersection of said further link in place of insufficient traffic data in respect of the traffic intersection of said travel route link.

33. The method according to claim 32, wherein said step of using available traffic data takes account of one or more of the following:
  a) geometry of said intersections;
  b) orientation of said intersections;
  c) the relative DOS of said intersections;
  d) historical daily averages for signal cycle times for said intersections;
  e) distance of said intersections from locations of relatively high population density.

34. The method according to claim 31, comprising the step of the intended recipient receiving the customized forecasted traffic information for all traveler profiles and separating the information relating to each traveler profile and transmitting the relevant traffic information to each individual traveler according to their profile.

35. The method according to claim 31, comprising the step of an individual traveler, having a traveler profile and a remote terminal, receiving customized forecasted traffic information on that terminal.

36. The method according to claim 35, wherein the remote terminal is operable to transmit information to the database, the method comprising the step of an individual traveler transmitting information to the database.

37. The method according to claim 31, comprising the step of determining from the traveler profiles the traveler at usual travel routes and usual commencement time on those routes.

38. The method according to claim 31, comprising the step of determining from the traveler's profile the times that travelers prefer to receive customized forecasted traffic information.

39. The method according to claim 38, comprising the step of sending customized forecasted traffic information to a traveler in accordance with the preferred times for receiving the information as determined from the travelers profile.

40. The method according to claim 38, including the step of a traveler accessing their stored travel prof tie and altering the data contained in that profile.

41. The method according to claim 31, wherein the step of integrating historical, real time and associated data with respect to the traveler's profiles to produce customized forecasted traffic information includes the steps of:
  a) determining the time series of average delays from historical data for links in a traffic network, the time series extending over a predetermined period of time;
  b) receiving historical weather data and correlating that weather data with the historical traffic data and generating an average historical delay for the links during various weather conditions;
  c) receiving real time data relating to weather in the geographic region of the traffic network;
  d) estimating the actual link delays that will occur on each of the traffic links for each of the time series based upon the received data; and
  e) generating a prediction of the actual delay from a commencement node to a destination node of the traffic network by summing the respective link delays of the links along the travel route using the estimate for each link delay at the time the traveler is expected to commence travel along those links.

42. The method according to claim 41, wherein the step of integrating historical, real time and associated data with respect to traveler profiles includes the step of determining seasonal trends in the historical data relating to average link delays and removing those seasonal trends from the historical traffic data.

43. The method according to claim 41, wherein the step of integrating historical, real time and associated data with respect to traveler profiles includes the step of estimating the actual traffic link delay that will occur for a link some time in the future by receiving real time traffic data relating to measured delays on traffic links and calculating the ratio of the most recently measured traffic link delay to the average historical link delay for the corresponding time step at which the measurement was taken and multiplying the average historical link delay for the link at a future time step with the previously established ratio thus generating an estimate of the actual link delay that will occur for the link at the time step in the future.

44. The method according to claim 43, wherein the step of integrating historical, real time and associated data with respect to traveler profiles includes the step of generating an estimate of the actual traffic link delay that will occur for a link some time in the future for all traffic links of the network relevant to traveler profiles.

45. The method according to claim 41, wherein the step of integrating historical, real time and associated data with respect to traveler profiles includes the step of determining predictions of actual delays that will occur for travel routes according to traveler profiles at the times required by each respective traveler profile.

46. The method according to claim 41, wherein the step of integrating historical, real time and associated data with respect to traveler profiles includes the step of receiving data relating to events such as school holiday periods, summer holiday periods, public holidays and weekends and correlating that data with the historical traffic data.

47. The method according to claim 41, wherein the step of integrating historical, real time and associated data with respect to traveler profiles includes the step of modeling the historical and real time data by performing a least squares fit analysis to determine an average historical delay using the function:

$$\text{Delay} = a_0 + a_1 * Dr/(a_2 + Dr) + a_3 * R/(a_4 + R) + a_5 * Sh + a_6 * Ch + a_7 * We + a_8 * Ph + a_9 * Ph^- + a_{10} * Ph^+$$

Where
  Dr represents period since last rain
  R represents rainfall in last predetermined period
  Sh represents school holiday period
  Ch represents common summer holiday period
  We represents a weekend or weekday
  Ph represents a public holiday
  $Ph^-$ represents a day before a public holiday
  $Ph^+$ represents a day after a public holiday.

48. The method according to claim 41, wherein the step of integrating historical, real time and associated data with respect to traveler profiles includes the step of receiving data relating to estimated link delays caused by incidents and storing that data for subsequent access whereby estimated delays caused by incidents are summed with historically expected link delays when predicted travel delays are generated.

49. The method according to claim 41, further comprising the step of estimating travel time on a particular link on the basis of prior links to said particular link traversed and taking account of the delay involved with traversing said prior links and intersections.

50. The method according to claim 41, including the step of identifying an optimal path of travel through a traffic network by determining a link travel time for each traffic link in a network and implementing a path searching method to determine the optimal path between two nodes in the traffic network, the optimal path being the series of connected traffic links between the two nodes resulting in the least expected delay.

51. The method according to claim 39, wherein the step of determining link travel time for a traffic link in a network includes the step of summing the mean free travel time for that link and the average time required to negotiate the immediate upstream intersection connected to that link.

52. The method according to claim 51, wherein the determination of the mean free travel time for a traffic link includes the step of obtaining the mean free travel speed by dividing the vehicle flow rate for the link by the vehicle concentration for the link and obtaining the mean free travel time by dividing the distance of the link by the mean free travel speed.

53. The method according to claim 51, including the step of obtaining an average time to negotiate an immediate upstream intersection from the traffic network traffic control system.

54. The method according to claim 50, including the step of identifying a request to provide an optimal travel path through a travel network and upon receipt of such a request, comparing measured link delays most recently collected from traffic signal data with historical link delay data and estimating the actual link delay for each traffic link in the network for an appropriate number of steps in the time series according, the traveler's commencement and destination nodes in the network.

55. The method according to claim 54, including the step of identifying whether sufficient recent real time link delay data for a traffic link is available according to a pre-established criteria and in the event that sufficiently recent link time delay data is not available, making use of historical link delay data.

56. The method according to claim 41, including the step of identifying whether there is insufficient historical traffic data for links in a traffic net-work to generate historical link delay data in accordance with a pre-established criteria and in the event of identifying that insufficient data exists, using available traffic data for other links in the same and/or different networks as estimates for those various links for which there is no available data.

57. The method according to claim 56, wherein the step of using available traffic data for other links in the same and/or different network as estimates for the various links for which there is no available data includes the step of matching the traffic links for which no traffic data is available to other traffic links for which traffic data is available, the method step taking account of one or more of the following:
 a) the relevant geometry of the traffic links;
 b) the relative arrangement of the traffic links;
 c) the relative capacity of the traffic links;
 d) the relative alignment of the traffic links with locations of relatively high population density;
 e) the relative DOS of the traffic links;
 f) the relative distance of the traffic links from locations of relatively high population density.

58. The method according to claim 31, further comprising the step of matching traffic data available for a portion of a city or urban area to another city or another urban area having similar traffic flow characteristics to the first mentioned city or urban area, in order to estimate the traffic data in said another city or said another urban area, wherein no traffic data is available for said another city or said another urban area.

* * * * *